United States Patent [19]

Kondraske et al.

[11] Patent Number: 4,674,112
[45] Date of Patent: Jun. 16, 1987

[54] CHARACTER PATTERN RECOGNITION AND COMMUNICATIONS APPARATUS

[75] Inventors: George V. Kondraske, Arlington; Adnan Shennib, Lake Jackson, both of Tex.

[73] Assignee: Board of Regents, The University of Texas System, Austin, Tex.

[21] Appl. No.: 773,371

[22] Filed: Sep. 6, 1985

[51] Int. Cl.[4] .......................................... H04M 11/00
[52] U.S. Cl. ........................................ 379/96; 379/97
[58] Field of Search ................... 179/2 A, 2 DP, 6.11; 340/825.48, 825.74; 379/52, 77, 93, 96, 97, 105

[56] References Cited

U.S. PATENT DOCUMENTS

| | | | |
|---|---|---|---|
| 4,307,266 | 12/1981 | Messina | 179/2 DP |
| 4,578,540 | 3/1986 | Borg et al. | |
| 4,608,460 | 8/1986 | Carter et al. | |
| 4,633,041 | 12/1986 | Boivie et al. | |

OTHER PUBLICATIONS

Rabiner et al., "Digital Techniques for Computer Voice Response: Implementations and Applications", *Proceedings of the IEEE*, vol. 64, No. 4, Apr. 1976, pp. 416–433.
Smith et al., "Alphabetic Data Entry Via the Touch-Tone Pad: A Comment", *Human Factors*, vol. 13(2), Apr. 1971, pp. 189–190.

*Primary Examiner*—Keith E. George
*Attorney, Agent, or Firm*—Arnold, White & Durkee

[57] ABSTRACT

A communication apparatus and method designed to interface with a standard, twelve key, dual tone, multiple frequency telephone, which allows easy, non-verbal entry of a message. Although particularly designed for use by the hearing and/or speech impaired with a dual tone telephone, the apparatus is equally adapted for use with practically any communication network where a keyboard with a limited number of keys is utilized and ambiguity resolution necessary. Generally speaking, the apparatus is connected to the earpiece of a receiving telephone and includes a tone pickup and decoder, a pre-programmed microcomputer and a message display panel. The message sender depresses a single key which corresponds to the alphabetic letter in the word being sent - because most keys on a telephone represent three letters, such a word is ambiguous when sent. The apparatus receives the ambiguous word and resolves the ambiguity in favor of a preprogrammed word which is displayed to the person receiving the message. Although the apparatus can be programmed to recognize words, the apparatus is programmed with a vocabulary of syllabic elements which are used to reconstruct the word. This approach enables an expanded word recognition capability while minimizing memory requirements.

14 Claims, 8 Drawing Figures

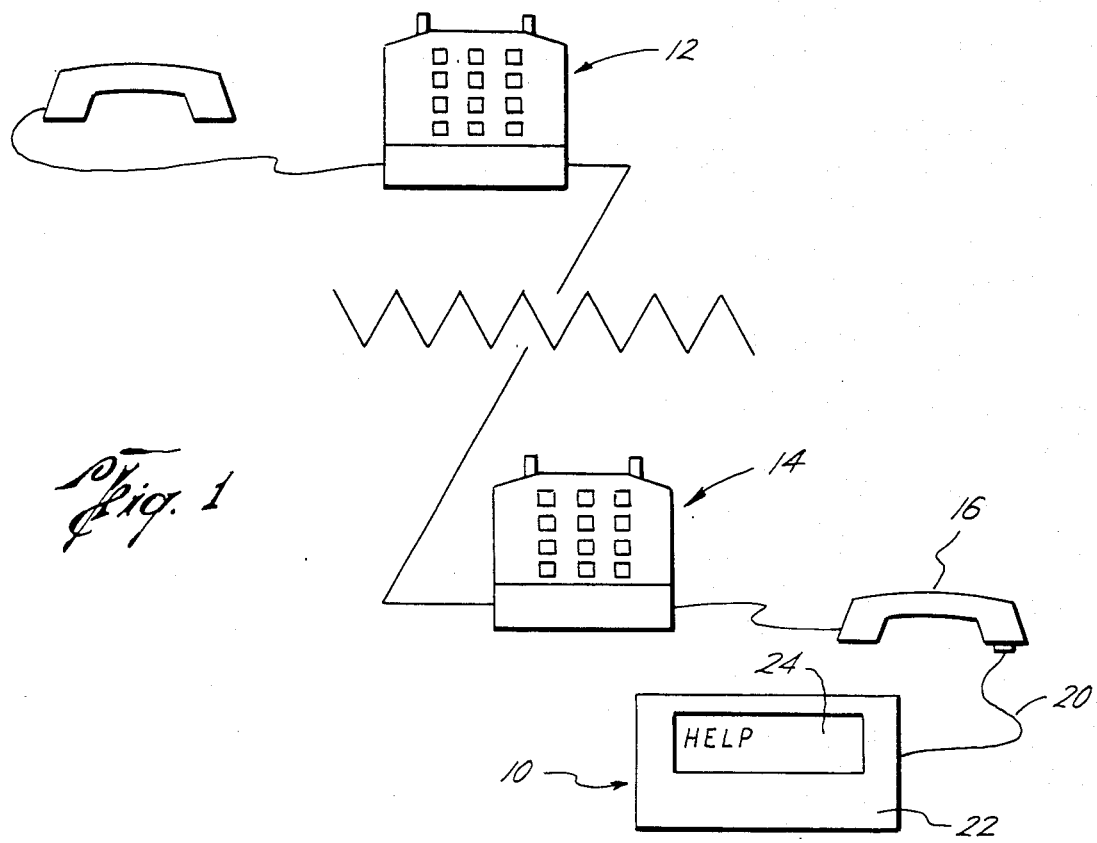

CHARACTER PATTERN RECOGNITION AND COMMUNICATIONS APPARATUS

BACKGROUND OF THE INVENTION

1. Field of the Invention

The present invention relates to an apparatus and method for communicating by manual entry on a keypad using a minimum of key stroke entries. More particularly, the invention relates to an apparatus and method for use by the hearing or speech impaired to communicate over the telephone network using a standard twelve key, dual tone, multi-frequency telephone.

2. Description of the Prior Art

For the hearing or speech impaired to effectively communicate over a long distance, several methods have been devised which enable nonverbal communication over a communications network, such as a telephone grid. Such devices include relatively expensive and nonportable radio teletype terminals and communications-adapted computer terminals. Such terminal keyboards typically employ a standard "QWERTY" keyboard which enables the passage of messages by simply typing in the entire message. Such terminals are, of course, deficient in that they are not only expensive, but also are bulky and difficult to transport.

It has been recognized that it is desirable to use a standard 12 key, dual tone multiple frequency (DTMF or Touch-tone) telephone to communicate between the hearing or speech impaired. Utilizing such a standard "Touch-tone" telephone would be inexpensive and provide a partial solution to the problem of transporting bulky communication equipment. A primary difficulty with using such "Touch-tone" telephones is that the industry standard telephone keypad utilizes 12 keys. Ten of the keys represent a single numeric character, while 8 of the keys each represent 3 alphabetic characters.

To utilize such a standard "Touch-tone" telephone for nonverbal communication, past solutions have used multiple keystroke entries to identify a particular alphabetic letter. For example, a first depression identifies which key the desired letter appears on and a second depression identifies which letter of the three possibilities is desired for input.

The necessity for depressing two keys to identify one letter, is of course a major impedimate to effective telecommunication using a standard "Touch-tone" telephone. That is, even short messages require a large number of keystrokes to enter the message.

SUMMARY OF THE INVENTION

The problems outlined above are in large measure solved by the communications apparatus and chatacter pattern recognition method of the present invention. That is, the method and apparatus hereof provides for a single keystroke to identify which alphabetic character is desired. Because each keystroke can represent three possibilities, each keystroke transmitted—and therefore the composite word—is inherently ambiguous. The apparatus hereof receives the ambiguous word and reconstructs and displays the word based upon a preprogrammed ambiguity resolution. To simplify operation and memory size, the apparatus recognizes a particular word in terms of syllabic elements. The syllabic elements can comprise any number of alphabetic characters (for example, from 1 to 9 alphabetic characters).

Generally speaking, the apparatus hereof includes a receiving mechanism coupled to a telephone which receives a series of transmitted tones corresponding to an inputted word. With a standard "Touch-tone" telephone, each tone received by the receiving mechanism represents three possible alphabetic characters. The receiving mechanism translates each tone into a code—a series of codes corresponding to a word. A controller receives the series of codes and outputs a signal indicative of a particular word which corresponds to the series of codes. The controller advantageously has a recognition means which matches the series of codes received with a programmed code sequence indicative of the particular word. Once the particular word is identified, a signal representative of the particular word is passed to an indicating means which displays the word to the receiving person.

Preferably, the receiving mechanism amplifies the ambiguous tone and decodes the tone into binary code. The binary code is passed to the controller which is preferably a preprogrammed microcomputer. The microcomputer fetches the word or syllabic element vocabulary from memory and begins comparing the binary code with the vocabulary. The controller constructs a particular word corresponding to the received binary code and generates a signal to the indicating mechanism representative of that particular word.

Preferably, the indicating means comprises a liquid crystal diode display which visually represents the word or message to the user. In another embodiment, a speech synthesizer audibly communicates the word or message to the user.

The preferred communication method of the present invention contemplates inputting a word or series of words into a standard "Touch-tone" telephone keyboard by depressing a single key for each alphabetic character of the word. The characters are thus transmitted as a series of tones which are decoded by the apparatus hereof into a binary code. The binary code is matched with a preprogrammed vocabulary code representive of an alphabetic character string, such as a word or syllabic element. The word is then output to the receiving person. Although the preferred embodiment anticipates using the apparatus hereof as a receiving unit, it will be appreciated that the apparatus can be easily modified within the scope of the present invention to act as a transmission unit. For example, the apparatus can be modified to utilize a speech synthesizer, with the message sender inputting a word or a series of words into the telephone with the apparatus converting the input into an audible message.

Another important alternative is to utilize the apparatus and method for other modes of communication. For example, the apparatus and method hereof can be incorporated into a paging system network, radio telephone network, or practically any communications network where ambiguity resolution is necessary because of limited keystroke inputs.

BRIEF DESCRIPTION OF THE DRAWINGS

FIG. 1 is a diagramatic view of a typical transmitting and receiving telephone to which the apparatus hereof is operably connected;

FIG. 2 is a plan layout of a dual tone, multiple frequency, twelve key telephone keyboard;

- FIG. 5 is a flowchart of the main program for determining whether a numeric or alphabetic character is input, FIGS. 6 and 7 depict the alphabetic subroutine, FIG. 8 illustrates the numeric subroutine.

DESCRIPTION OF THE PREFERRED EMBODIMENTS

Figure 3:
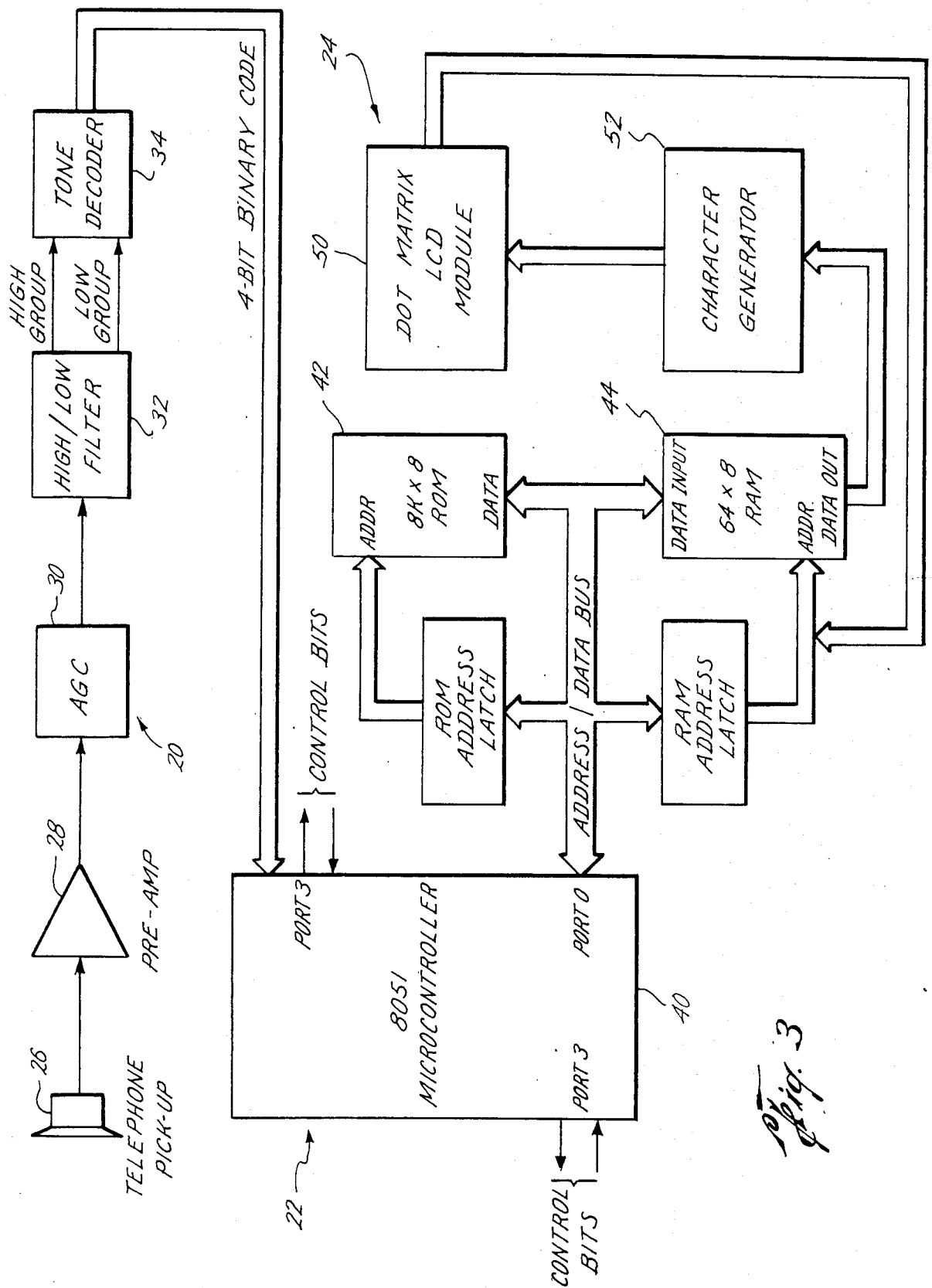
FIG. 3 is a block diagram of the system components of the apparatus hereof.

Turning now to the drawings, a communications apparatus 10 is illustrated in FIG. 1 in conjunction with a telephone network having a sending telephone 12 and receiving telephone 14. Each telephone 12, 14 has a hand piece 16 and a twelve key "Touch-tone" key pad 18. Each telephone 12, 14 represents a common, industry standard touch tone system in which a key closure generates two tones according to the dual tone multiple frequency standard. As can be seen from FIG. 2, the standard industry key pad 18 presents twelve keys containing alphabetic and numeric characters, as well as the asterisk (*) and number ("#") characters. FIG. 2 differs slightly from the industry standard in that in a standard touch tone telephone, the alphabetic characters "Q" and "Z" are omitted. In FIG. 2, the letters "Q" and "Z" are carried by the key representative of numeral "1".

Figure 6:
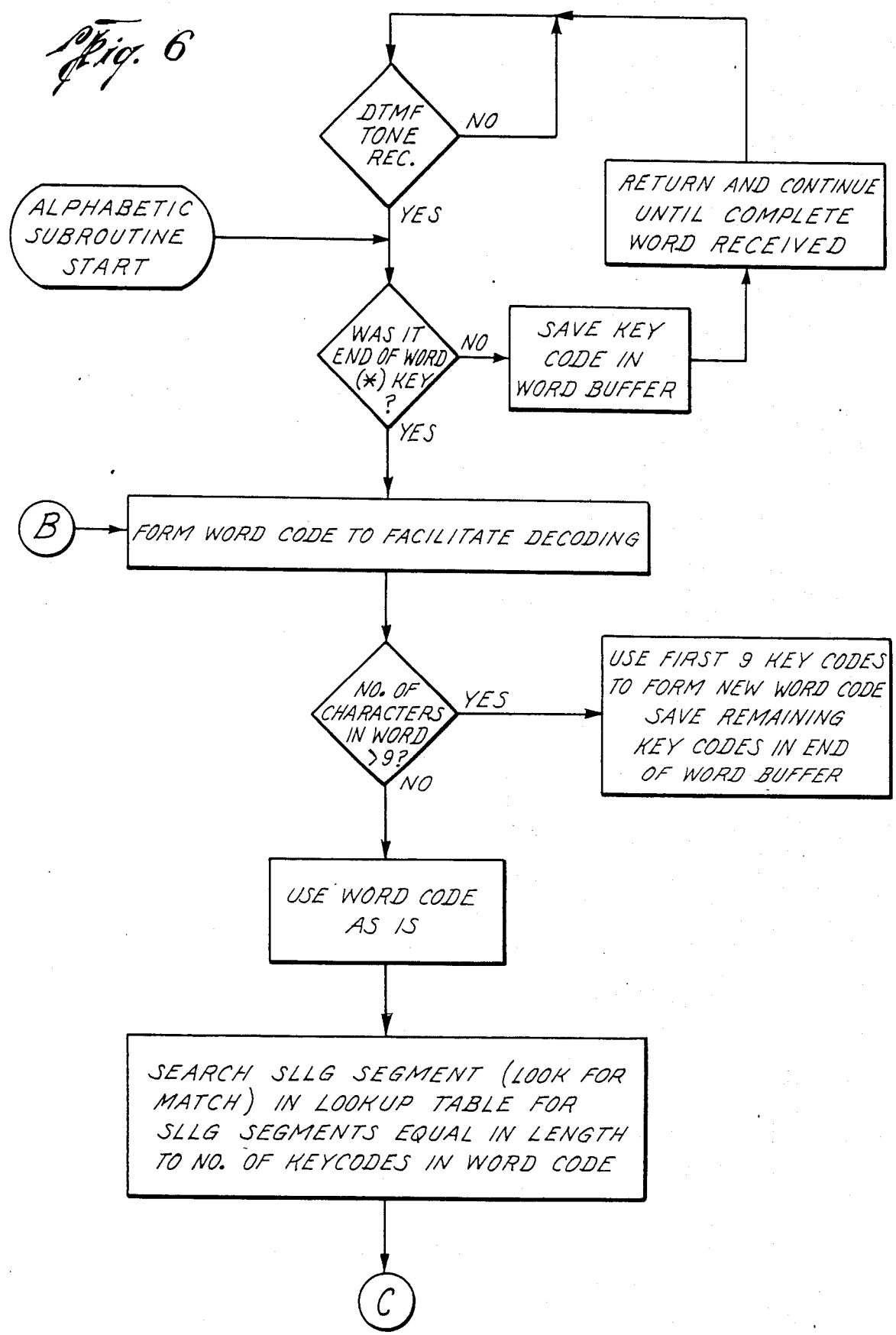
Figure 7:
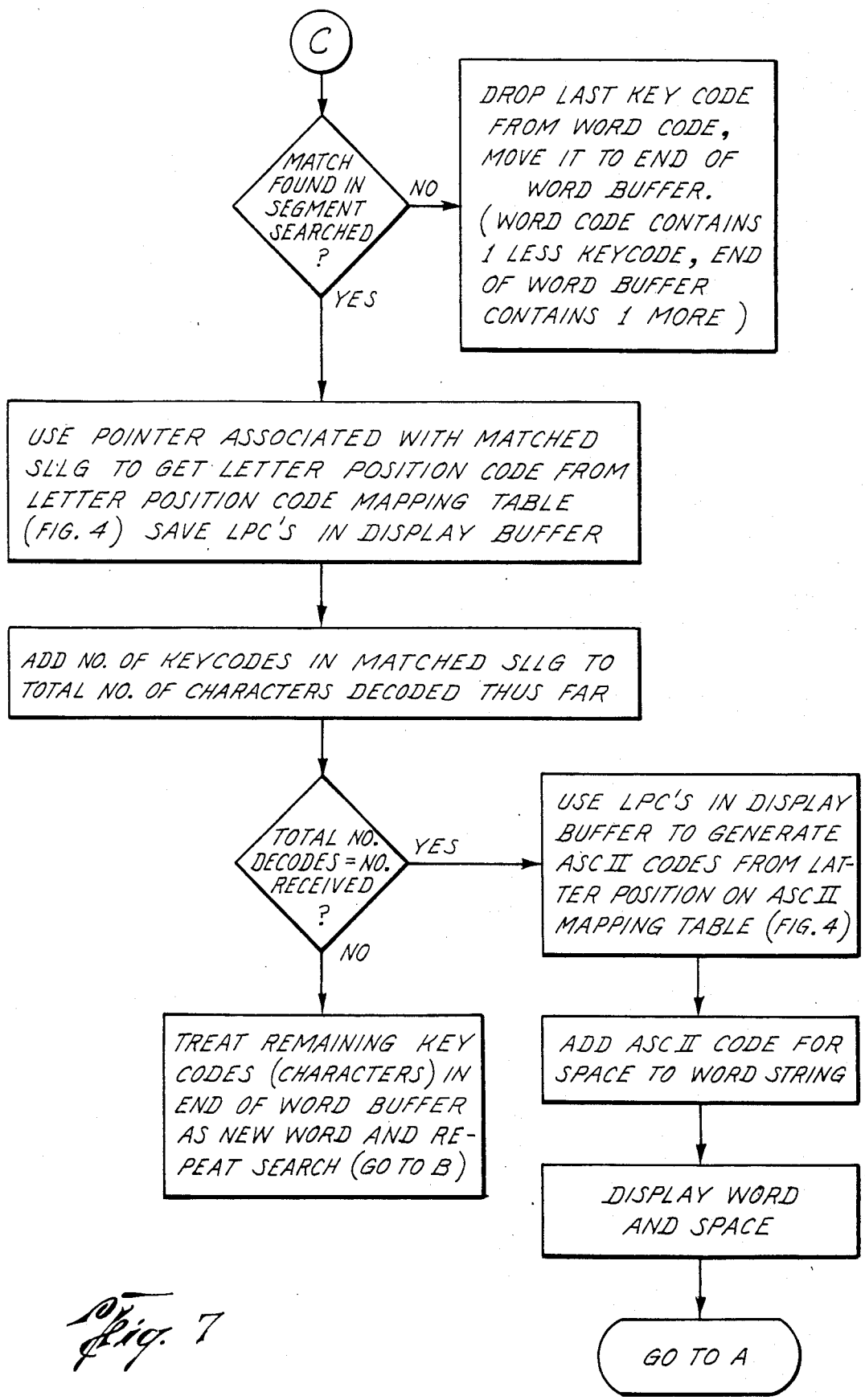

Comparing FIGS. 1 and 3, the communications apparatus 10 is shown in more detail. Broadly speaking (see FIG. 1), the apparatus 10 includes receiving means 20, controller means 22, and indicating means 24. In more detail, the receiving means 20 includes an inductive pick-up 26 attachable to the ear portion of the hand piece 16 by a suction cup. In the preferred embodiment, a preamp 28 provides a fixed gain of 60 dB to the automatic gain control amplifier 30. The automatic gain control amplifier 30 has a gain range of 0.1-20 dB resulting in a total gain for the amplifier section (28,30) in the range of 30-100 dB. The output of the automatic gain control (1.5 volts p—p) is fed to a filter section 32 (AMI S3525A intergraded circuit) to separate the high and low dual tone multiple frequency bands. As shown in FIG. 6, the high and low group filter outputs are fed to a tone decoder 34 (e.g., Mostek MK-5102). The tone decoder 34 provides a four-bit binary code to the controller means 22 for each signal received at its input.

The controller means 22 preferably incorporates a microcomputer (Intel 8051) with on-chip RAM and ROM. In FIG. 3, the controller means 22 is illustrated somewhat schematically and depicts the microcomputer 40, ROM 42 (preferably 8K byte EPROM) and 64 bytes×8 RAM 44. Preferably, the programed vocabulary is stored on the ROM 42 with the RAM 44 used to store word codes as received, thus providing a buffer to the indicating means 24.

Preferably, the indicating means 24 includes a liquid crystal diode (LCD) display 50 capable of displaying two rows of alpha numeric characters of twenty characters per row. A character generator 52 is coupled to the RAM 44 and the LCD display 50 to generate standard dot matrix characters on the display 50. The LCD display 50 also addresses the RAM 44 to periodically scan ASCII character data in the RAM 44.

Software

Figure 4:
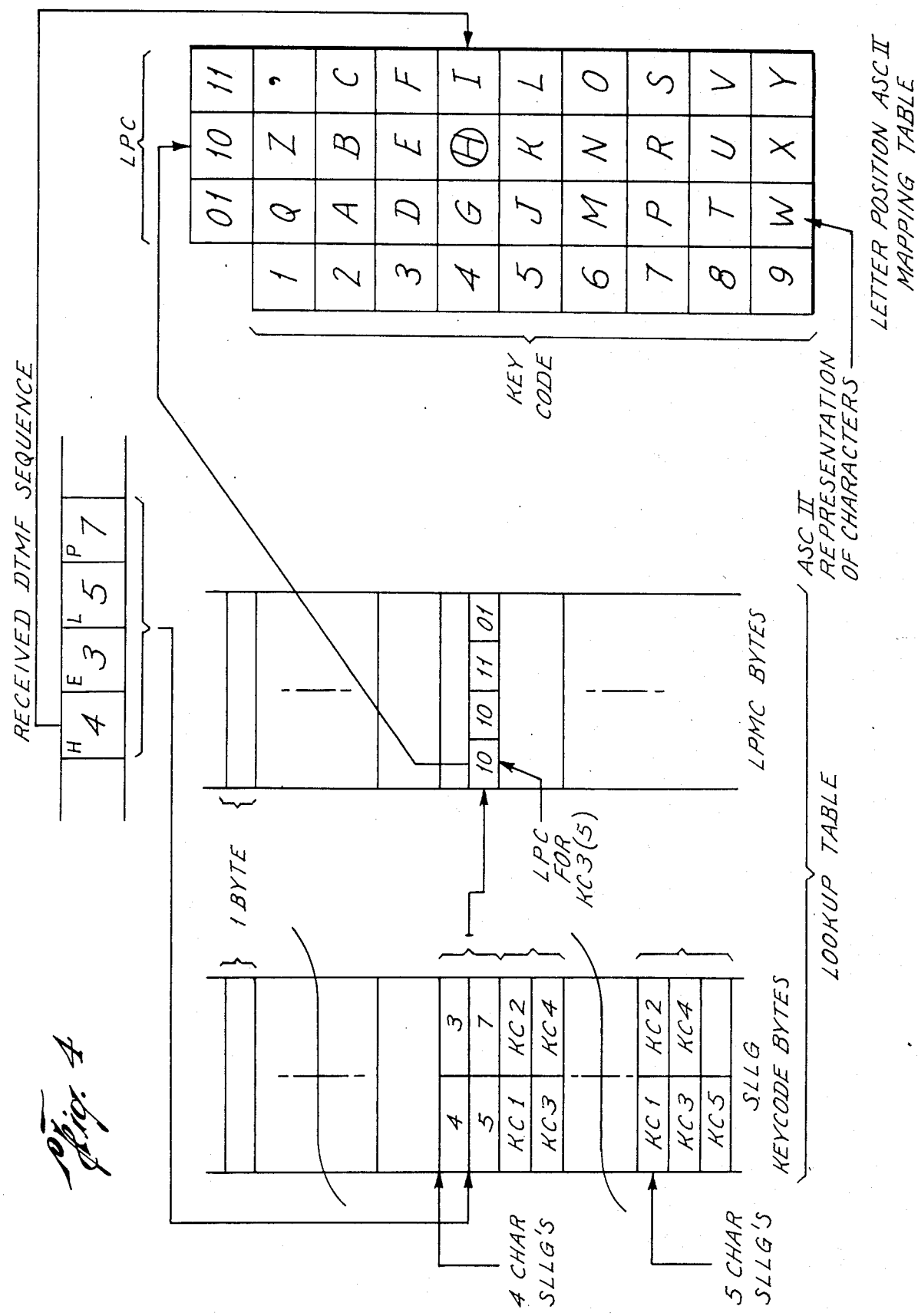
FIG. 4 is a schematic representation of the look-up table and ASCII mapping table utilized by the present invention.
Figure 5:
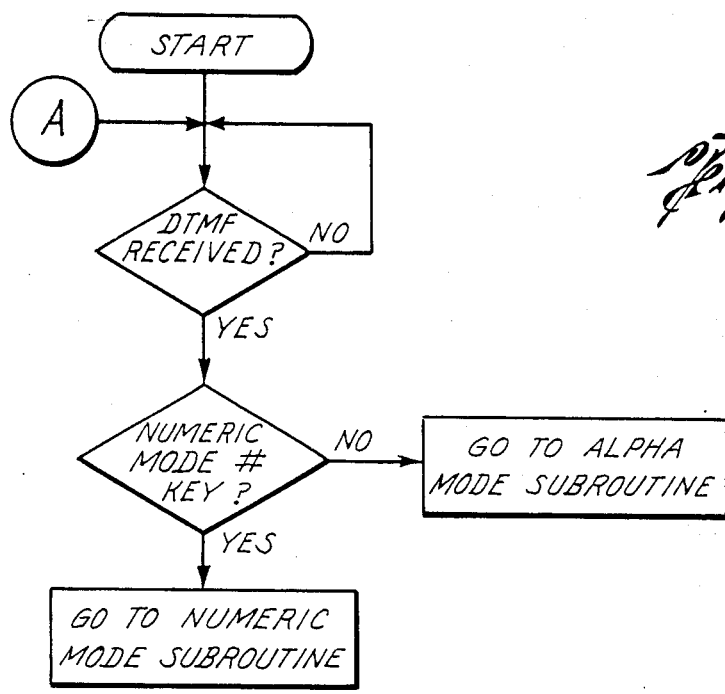
FIGS. 5-8 are flow-charts illustrative of the software utilized in the apparatus of the present invention, where
Figure 8:
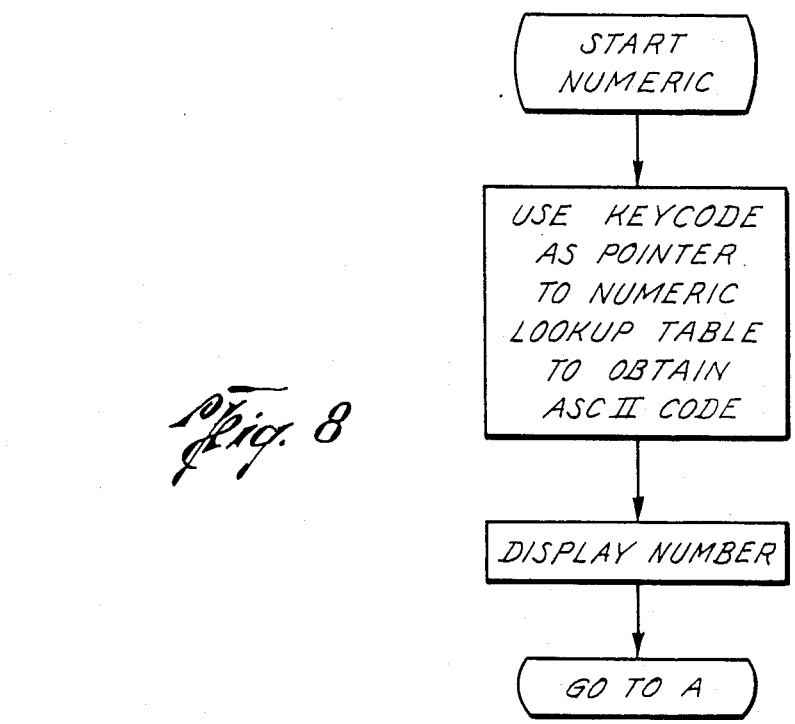

FIGS. 4-8 generally refer to the implementation of the recognition process employed by the controller means 22. FIG. 4 illustrates an example of a recognition search initiated in a segmented look-up table (left-hand portion of FIG. 4). The right-hand portion of FIG. 4 illustrates the ASCII mapping table where the ASCII code for the proper character is stored and fetched for each alpha numeric character. It should be apparent that use of the mapping table results in a considerable memory saving over the alternative of storing complete ASCII strings in memory. FIGS. 5-8 illustrate the flow-charts for the operating programs. The flow-charts are self explanatory. The operation of the lookup table and ASCII mapping table is readily apparent from a comparison of FIGS. 4 and 6-7.

Operation

The initial problem addressed by the present invention was to provide a simple method for the hearing or speech impaired to communicate using standard "Touch-tone" telephones without the need for complicated equipment, such as teletypes, etc. Several devices and methods have been devised which allow for effective communication, but are slow and difficult to use; a large number of keystrokes are involved in inputting a message. As can be seen from FIG. 2, most keys represent three alphabetic letters. Therefore, in the past, a single letter has been input using two keystrokes. For example, to input the alphabetic letter "H" in the word "HELP", the Operator would first push the number "4" key (row 2 column 1) followed by the "0" key (row 4, column 2) to designate the second character on the number "4" key.

In a broad sense, the present invention recognizes the possibility of using a microprocessor-based device to enable a single keystroke per alphabetic letter. That is, it has been found that most English words are identified by the keystroke sequence required to enter the letters of the word—a character pattern recogniton. Of course, the invention is equally applicable to the identification of words in other languages as well.

For example, to enter the word "HELP" the numbered keys "4, 3, 5, and 7" are depressed followed by a "*". The "*" key is used to delineate the end of a word. The term "word code" is used to denote the key sequence for a particular word; that is "4357" is the word code for the word "HELP." Of the $3^4$ possibilities (3 characters on each key, four keys to enter the word), there is only one English word—"HELP"—from the $3^4$ possibilities involved.

Because each key on a standard "Touch-tone" keyboard presents three alphabetic characters per key, using the single keystroke entry contemplated by the present invention results in an inherently ambiguous key code. Thus, the dual tones for each key depression presents an ambiguous series of tones to the receiver. However, as with the word "HELP," it was found that over 96% of the most commonly used words could be identified by the word codes generated.

Therefore, in a broad sense, the apparatus 10 could incorporate a stored vocabulary of word codes and the corresponding ASCII representation for each word in a memory look-up table. When a sequence of word codes is entered followed by an "*", a search could be initiated in memory which points to the correct ASCII characters to be displayed. In practice, storing complete word codes and ASCII representations in memory was found to limit word recognition capability to the stored word vocabulary, and even then, large memory size was necessary.

In the preferred embodiment, "syllabic elements" are stored in memory and combined to create the words. For example, the "CON" letter group in contest, silicon, conference, contact, etc. is such a stored syllabic element. Thus, the vocabulary stored in the preferred embodiment includes common letter-groups, suffixes, prefixes, single letters, and a few complete words, generically referred to as "syllabic elements." In the preferred embodiment, it was found most efficient to include several letter strings which provide and enhance word recognition capability; therefore the vocabulary of syllabic elements in the preferred embodiment includes elements having one alphabetic letter to as many as nine alphabetic letters. Most syllabic elements have a three to six letter group size.

To further reduce memory size, the preferred embodiment enclosed incorporates an ASCII mapping table illustrated schematically in FIG. 4. That is, instead of allocating memory for the ASCII representation for each syllabic element, the ASCII representation is developed from the mapping table.

In use, the receiving individual must attach the conductive pick-up 26 to the ear portion of the hand piece 16 (see FIG. 1). The sending individual simply enters the desired alphabetic letters of the desired message on the touch-tone telephone 12 sequentially. The asterisk key "*" is used as a space to separate words. The number key "#" is used before or after any information that should be interpretated as numeric information. Of course, the sender cannot use abbreviations. The apparatus 10 responds in real time, beginning the recognition process as soon as the space key is received. The text of the message is displayed on the LCD display 50 from the lower left position to the right. When the lower row is filled the entire row is scrolled upward to allow new text to appear in the lower row.

As can be seen from FIG. 3, the series of tones constituting each word are decoded into a binary code. In the preferred embodiment each key depression represents a "key code" indicative of the key depressed. Two key codes are entered per byte, thus, the first byte contains the four bit binary code representation of the first two key codes of a word. The word code comprises a series of key codes entered between the asterisk "*," and in the preferred embodiment can occupy up to 7 bytes, accommodating word sizes up to fourteen characters. If the word has an odd number of characters, and therefore an odd number of key codes, the last key code is stored in the high order four bits of the last byte and the low order bits are set to zero.

The microcomputer 40 (FIG. 3) reads the four bit binary code upon receiving a latch signal from the tone decoder 34. The program (FIGS. 5–8) and stored syllabic element vocabulary are fetched from ROM 42. The word recognition process is initiated as soon as an entire word code is received (as indicated by the asterisk input).

Turning to FIG. 4, the recognition search is initiated in the segmented look-up table that contains the key codes in the four bit format for the syllabic element vocabulary. The look-up table is segmented according to syllabic element size with the size of the word to be decoded determining the point of entry into the look-up table. In the preferred embodiment, there are nine segments in the look-up table corresponding to syllabic elements ranging from one to nine characters in size. For words having more than nine characters, the search is initiated in the ninth segment and a new word code corresponding to the first nine keystrokes (key codes) of the word is formed (see also FIG. 6). Of course, the size of the syllabic element is known upon entry into a given segment, therefore the number of bytes required to store the key codes for each of the syllabic elements will also be known.

Although the word code typically occupies more than one byte, only the first byte is checked for a match initially. The other bytes are checked only when a match occurs for all the previous bytes for the given syllabic element. If no match is detected, the search proceeds to the next syllabic element in the segment of the table. If no match is found in the segment of the table for the syllabic element size equal to the size of the word, the search is continued in the segment of the next lower size. That is, the word code is recomputed to exclude the last received key code for later use in the recognition process. This procedure is repeated until a match occurs. At the latest, a match will occur upon entering the single character segment of the look-up table.

After the first syllabic element is identified, the search is repeated using a reduced word code. The reduced word code comprises the original word code less the first N characters, where N is the size of the first syllabic element identified. This cycle is repeated until the complete word is identified. Most words are identified by connected syllabic elements 2 to 4 characters in size. However, there are a limited number of large syllabic elements of 5 to 9 characters which are used to identify words that are difficult to separate into unambiguous short syllabic elements.

Some syllabic elements have the same word code and therefore can have multiple interpretations. Such multiple meaning syllabic elements are specially flagged in the look-up table and stored in a way that the most frequently occurring interpretation is decoded first. If the element displayed on the LCD display 50 does not make sense to the reader, he can replace the string with the alternate interpretation by pressing a retry button (such as the operator or "O" key). Of course, in many cases the user can interpret such alternative interpretations from the context of the other syllabic elements forming the word or other words in the message.

Although the display could be generated by storing a pointer to the proper ASCII string representing each syllabic element in the look-up table, the preferred embodiment utilizes an indirect referencing technique. As illustrated in FIG. 4, an ASCII mapping table is utilized to identify the proper ASCII string for the syllabic element recognized in the look-up table. The first input to the ASCII mapping table is the key code which is known and limits the possible choices for the alphabetic character to a maximum of three.

The second pointer to the ASCII mapping table is generated to correspond with the position of the alphabetic character on the particular key depressed. To this end, a series of letter position mapping codes (LPMC) bytes are formulated for each word code. Each LPMC byte contains four 2-bit letter position codes (LPC). Each LPC can take the value of either 1, 2, or 3 depending upon the letter position on the key. As can be seen from FIG. 4, the binary representation of the letter position is used to enter the ASCII mapping table, 01 for the first letter positioning, 10 for the second letter positioning and 11 for the third letter positioning. Thus, the key code (KC) and letter position code (LPC) act as column and row pointers into the ASCII mapping table to find the proper ASCII code for the character. The ASCII code is fetched and moved to an output buffer. This method requires only 27 bytes of ASCII character storage as each possible character is stored only once, and an additional 8 bits per 4 characters to store the letter position codes (LPC).

FIG. 4 illustrates the recognition process for the word "HELP". The word code, "4357" is passed to the four character segment of the look-up table. As previously discussed, the microcomputer 40 begins the search process until a match is formed. The matched word code points to a letter position mapping code (LPMC) byte. As illustrated in FIG. 4, the first letter position code (LPC) in the letter positioning mapping code (LPMC) byte has the binary code (10) for "2" which is the letter position of "H" on the number "4" key. The LPC is used as the column pointer in the ASCII mapping table with the key code used as the row pointer to identify the letter "H".

In practice, the apparatus 10 recognizes the entered words as fast as the words can be entered by the sender. Thus, the apparatus 10 is real time, displaying the decoded word on the LCD display 50 less than 1 second after the asterisk key is depressed. A prime advantage of the method and apparatus 10 is that single character entry is sufficient for communication. This represents a significant advance as a communication aid for the handicapped.

Of course, the apparatus 10 hereof is equally adaptable for use in many other situations. For example, with a paging system where space is limited, a small number of keys could be incorporated to efficiently send a message using the single character entry recognition of the present invention.

Although the present invention contemplates that the sender will simply use a standard touch-tone telephone and the receiver will utilize the apparatus 10, roles could be reversed. The apparatus 10 can be used as a sending device which incorporates a speech synthesizer. That is, the sender would couple the device 10 to the mouth section of hand piece 16 of the sending telephone 12 and generate the message on the key pad 18. Apparatus 10 would generate synthetic speech audibly conveyed to the receiving telephone 14.

Still another alternative would be to use the apparatus 10 of the present invention for remote computer control by non-handicapped individuals. For example, using the single character entry, words like PRINT, LIST, SAVE could be easily recognized and the output controlled. If fact, better results and an expanded vocabulary can be obtained if the characters on the standard telephone key pad 18 are distributed differently. That is, the sender could use an overlay with optimum character distribution to send his message. While this approach may be feasible for remote computer use, simplicity considerations for the handicapped dictate using the standard key pad 18 with suboptimum character distribution.

The apparatus 10 could also be used for consumers to enter orders to a vendor's computer. Many variations exist; the apparatus 10 enabling the entry of messages easily into a computer or practically any message receiver.

We claim:

1. A communications apparatus comprising:
   receiving means operably connectable to a telephone or the like for receiving a series of transmitted tones corresponding to an input word and for decoding the tones into a series of codes, each tone being representative of a letter of the word, which letter is one of two or more alphabetic characters corresponding to the tone;
   controller means coupled to said receiving means for processing said series of codes and outputting a signal indicative of a particular word which corresponds to said series of codes, said controller means including, recognition means for matching said series of codes with a programmed code sequence indicative of said particular word,
   said recognition means including a stored vocabulary comprising a plurality of syllabic elements, each being representative of one or more alphabetic characters, said recognition means being operable for matching said series of codes with one or more syllabic elements and outputting a signal indicative of a particular word represented by said one or more syllabic elements; and
   indicating means for receiving said signal and communicating the signal in a form perceptible to the user.

2. The apparatus according to claim 1, wherein said receiving means includes an inductive pickup couplable to the ear piece of a telephone receiver.

3. The apparatus according to claim 1, wherein said receiving means includes an amplifier section for receiving and amplifying said tones.

4. The apparatus according to claim 1, wherein said receiving means includes a tone-decoder for decoding the tones into a binary code.

5. The apparatus according to claim 1, wherein said indicating means includes a visual display for communicating said particular word.

6. The apparatus according to claim 5, wherein said indicating means comprises a liquid crystal display module.

7. The apparatus according to claim 1, wherein said receiving means is operable for receiving tones indicative of numeric characters, said controller means is operable for receiving and processing said numeric-representative tones and outputting a numeric-representative signal, and said indicating means being operable for displaying said numeric-representative signal.

8. The apparatus according to claim 1, said recognition means including mapping means operably coupled to said receiving means and operable for identifying the two or more alphabetic characters represented by a discrete tone.

9. The apparatus according to claim 8, said mapping means operable for utilizing said programmed code sequence and said identified two or more alphabetic characters for generating an ASCII code representative of each character of said particular word, said plurality of ASCII codes generated being output from said controller means as a portion of said signal.

10. A method of communicating, utilizing a signal-generating keyboard where at least some of the keys represent two or more alphabetic characters, comprising the steps of:
    inputting a word into said keyboard by depressing a single key for each alphabetic character of said word;
    transmitting signals generated by the key depressions;

receiving said transmitted signals and decoding the signals into binary code;

matching said binary code with one or more pre-programmed codes, each pre-programmed code being representative of a syllabic element;

Forming a representation of the word from the one or more syllabic elements represented by the matched one or more pre-programmed codes; and outputting the word representation in a form perceptible to the user.

11. The method of claim 10, wherein the outputting step includes displaying said word in a visually perceptible form.

12. The method of claim 10, wherein the signal generated by the keyboard is a dual tone multiple frequency and the keyboard comprises a touch-tone telephone.

13. The method according to claim 10, wherein each pre-programmed code of the syllabic elements corresponds to the key depressed and the position of the character of the syllabic element on that key including the steps of:

providing an ASCII mapping table presenting the ASSCII strings corresponding to respective alphabetic characters;

identifying the ASCII string for each character of each matched syllabic element by entering the mapping table with reference to the key depressed on the keyboard for each character of the matched one or more syllabic elements, cross-referencing the position of the character on said depressed key to determine the discrete ASCII string for the alphabetic character; and outputting the ASCII string for each character of each syllabic element to an output buffer.

14. A method of recognizing an input word from an input series of codes in which each input code represents one letter of the word which letter is one of two or more letters that the code corresponds with, comprising the steps of:

establishing a limited vocabulary of syllabic elements representing one or more letters and comprising one or more codes in a lookup table, in which said word is not represented by a single syllabic element in the lookup table, the lookup table being separated into segments according to the number of letters of the syllabic elements;

matching the series of codes to two or more syllabic elements comprising the substeps of considering two or more successive codes of said word as a group, entering the lookup table in the segment corresponding to the number of codes in said group, comparing said group of codes with the codes of each syllabic element in said segment until a match is found, or if no match is found, decrementing the number of codes in the group, entering the lookup table in another segment corresponding to the number of codes in said decremented group, and comparing the decremented group of codes with codes of each syllabic element in said another segment until a match is found, or if no match is found, successively decrementing the number of codes in the group and comparing the decremented group of codes with the codes of each syllabic element in another segment until a match is found, and considering the remaining unmatched codes in said word as one or more additional groups and repeating the entering and comparing steps using each additional group until all of the syllabic elements of the word are identified; and outputting the two or more matched syllabic elements as said word.

* * * * *

(12) EX PARTE REEXAMINATION CERTIFICATE (6100th)
United States Patent
Kondraske et al.

(10) Number: US 4,674,112 C1
(45) Certificate Issued: Jan. 22, 2008

(54) CHARACTER PATTERN RECOGNITION AND COMMUNICATIONS APPARATUS

(75) Inventors: George V. Kondraske, Arlington, TX (US); Adnan Shennib, Lake Jackson, TX (US)

(73) Assignee: Board of Regents, The University of Texas System, Austin, TX (US)

Reexamination Request:
No. 90/007,738, Sep. 30, 2005

Reexamination Certificate for:
Patent No.: 4,674,112
Issued: Jun. 16, 1987
Appl. No.: 06/773,371
Filed: Sep. 6, 1985

(51) Int. Cl.
*H04M 11/06* (2006.01)
*G09B 21/00* (2006.01)

(52) U.S. Cl. .................. 379/93.18; 379/52; 379/906; 379/93.37

(58) Field of Classification Search ............... 379/93.18
See application file for complete search history.

(56) References Cited

U.S. PATENT DOCUMENTS

| | | | |
|---|---|---|---|
| 2,724,739 A | 11/1955 | Harris | |
| 3,076,932 A | 2/1963 | Jaffe | |
| 3,172,954 A | 3/1965 | Beiar et al. | |
| 3,283,063 A | 11/1966 | Kawashima et al. | |
| 3,457,368 A | 7/1969 | Houcke | |
| 3,585,303 A | 6/1971 | Chieffo | |
| 3,605,093 A | 9/1971 | Parks et al. | |
| 3,619,509 A | 11/1971 | Barger et al. | |
| 3,634,759 A | 1/1972 | Koshikawa et al. | |
| 3,644,898 A | 2/1972 | Post | |
| 3,647,973 A | 3/1972 | James et al. | |
| 3,675,513 A | 7/1972 | Flanagan et al. | |
| 3,701,856 A | 10/1972 | Stuck et al. | |

(Continued)

FOREIGN PATENT DOCUMENTS

| | | |
|---|---|---|
| DE | 3246467 | 7/1984 |
| GB | 2 015 220 A | 9/1979 |
| GB | 2 066 534 A | 7/1981 |
| GB | 2 118 749 A | 11/1983 |
| JP | 54-124935 | 9/1979 |
| JP | 58-131857 | 8/1983 |
| JP | 59-223834 | 12/1984 |
| JP | 60-068421 | 4/1985 |
| JP | 60-136863 | 7/1985 |

OTHER PUBLICATIONS

E.J. Desautels & S.B. Soffer, *Touch–Tone Input Techniques: Data Entry Using A Constrained Keyboard*, ACM Computing Surv., 245 (1974).

(Continued)

*Primary Examiner*—Albert J Gagliardi

(57) ABSTRACT

A communication apparatus and method designed to interface with a standard, twelve key, dual tone, multiple frequency telephone, which allows easy, non-verbal entry of a message. Although particularly designed for use by the hearing and/or speech impaired with a dual tone telephone, the apparatus is equally adapted for use with practically any communication network where a keyboard with a limited number of keys is utilized and ambiguity resolution necessary. Generally speaking, the apparatus is connected to the earpiece of a receiving telephone and includes a tone pickup and decoder, a pre-programmed microcomputer and a message display panel. The message sender depresses a single key which corresponds to the alphabetic letter in the word being sent - because most keys on a telephone represent three letters, such a word is ambiguous when sent. The apparatus receives the ambiguous word and resolves the ambiguity in favor of a preprogrammed word which is displayed to the person receiving the message. Although the apparatus can be programmed to recognize words, the apparatus is programmed with a vocabulary of syllabic elements which are used to reconstruct the word. This approach enables an expanded word recognition capability while minimizing memory requirements.

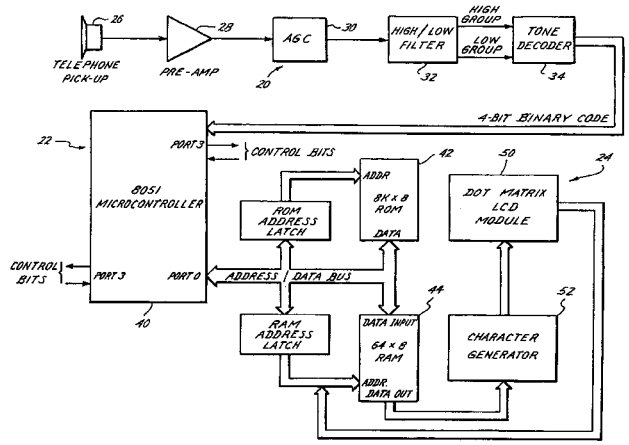

U.S. PATENT DOCUMENTS

| | | |
|---|---|---|
| 3,711,646 A | 1/1973 | Vermillon et al. |
| 3,733,437 A | 5/1973 | Keith |
| 3,746,793 A | 7/1973 | Sachs et al. |
| 3,772,597 A | 11/1973 | Stover |
| 3,803,592 A | 4/1974 | Hatley |
| 3,812,291 A | 5/1974 | Brodes et al. |
| 3,833,765 A | 9/1974 | Hilborn et al. |
| 3,870,821 A | 3/1975 | Steury |
| 3,881,097 A | 4/1975 | Lehmann et al. |
| 3,892,915 A | 7/1975 | Budworth et al. |
| 3,896,267 A | 7/1975 | Sachs et al. |
| 3,925,779 A | 12/1975 | Gerstenhaber |
| 3,938,099 A | 2/1976 | Hyder |
| 3,944,042 A | 3/1976 | Gremillet |
| 3,946,157 A | 3/1976 | Dreyfus |
| 3,950,734 A | 4/1976 | Li |
| 3,967,273 A | 6/1976 | Knowlton |
| 3,984,638 A | 10/1976 | Carrouge |
| 3,992,583 A | 11/1976 | Davis et al. |
| 4,005,388 A | 1/1977 | Morley et al. |
| 4,012,599 A | 3/1977 | Meyer |
| 4,029,915 A | 6/1977 | Ojima |
| 4,032,765 A | 6/1977 | Epstein et al. |
| 4,041,467 A | 8/1977 | Cota et al. |
| 4,044,381 A | 8/1977 | Shimano et al. |
| 4,057,756 A | 11/1977 | Ley et al. |
| 4,059,725 A | 11/1977 | Sakoe |
| 4,060,716 A | 11/1977 | Pekrul et al. |
| 4,087,632 A | 5/1978 | Hafer |
| 4,091,418 A | 5/1978 | Ciciora |
| 4,092,493 A | 5/1978 | Rabiner et al. |
| 4,096,934 A | 6/1978 | Kirmser et al. |
| 4,124,843 A | 11/1978 | Bramson et al. |
| 4,158,106 A | 6/1979 | Mason |
| 4,164,025 A | 8/1979 | Dubnowski et al. |
| 4,184,049 A | 1/1980 | Crochiere et al. |
| 4,191,854 A * | 3/1980 | Coles ..................... 379/93.18 |
| 4,201,489 A | 5/1980 | Zapp |
| 4,202,038 A | 5/1980 | Petersson |
| 4,215,240 A | 7/1980 | Ostrowski |
| 4,304,968 A | 12/1981 | Klausner |
| 4,307,266 A | 12/1981 | Messina |
| 4,313,038 A * | 1/1982 | Nilssen et al. .............. 379/283 |
| 4,314,099 A | 2/1982 | Jeffries et al. |
| 4,323,893 A | 4/1982 | Ypsilantis |
| 4,339,806 A | 7/1982 | Yoshida |
| 4,340,887 A | 7/1982 | Dias, II |
| 4,342,085 A | 7/1982 | Glickman et al. |
| 4,350,846 A | 9/1982 | Busche et al. |
| 4,360,892 A | 11/1982 | Endfield |
| 4,374,625 A | 2/1983 | Hanft et al. |
| 4,381,502 A | 4/1983 | Prame |
| 4,383,307 A | 5/1983 | Gibson |
| 4,385,291 A | 5/1983 | Piguet |
| 4,396,992 A | 8/1983 | Hayashi et al. |
| 4,426,555 A | 1/1984 | Underkoffler |
| 4,427,848 A | 1/1984 | Tsakanikas |
| 4,435,617 A | 3/1984 | Griggs |
| 4,438,505 A | 3/1984 | Yanagiuchi et al. |
| 4,440,977 A | 4/1984 | Pao et al. |
| 4,442,506 A | 4/1984 | Endfield |
| 4,443,065 A * | 4/1984 | Funada et al. ................ 349/76 |
| 4,449,145 A | 5/1984 | Ciciora |
| 4,449,839 A | 5/1984 | Bleuer |
| 4,450,520 A | 5/1984 | Hollaar et al. |
| 4,458,243 A | 7/1984 | Sado et al. |
| 4,459,049 A | 7/1984 | Howell et al. |
| 4,464,070 A | 8/1984 | Hanft et al. |
| 4,465,901 A | 8/1984 | Best |
| 4,467,437 A | 8/1984 | Tsuruta et al. |
| 4,471,165 A | 9/1984 | DeFino et al. |
| 4,479,236 A | 10/1984 | Sakoe |
| 4,481,508 A | 11/1984 | Kamei et al. |
| 4,486,741 A | 12/1984 | Nozawa et al. |
| 4,489,434 A | 12/1984 | Moshier |
| 4,499,553 A | 2/1985 | Dickinson et al. |
| 4,500,751 A | 2/1985 | Darland et al. |
| 4,503,426 A | 3/1985 | Mikulski |
| 4,509,187 A | 4/1985 | Ackland et al. |
| 4,531,119 A | 7/1985 | Nakayanna et al. |
| 4,532,378 A | 7/1985 | Nakayama et al. |
| 4,559,598 A | 12/1985 | Goldwasser et al. |
| 4,578,540 A | 3/1986 | Borg et al. |
| 4,581,484 A | 4/1986 | Bendig |
| 4,585,908 A | 4/1986 | Smith |
| 4,597,057 A | 6/1986 | Snow |
| 4,608,457 A | 8/1986 | Fowler et al. |
| 4,608,460 A | 8/1986 | Carter et al. |
| 4,612,532 A | 9/1986 | Bacon et al. |
| 4,625,587 A | 12/1986 | Hosono |
| 4,633,041 A | 12/1986 | Boivie et al. |
| 4,649,563 A | 3/1987 | Riskin |
| 4,650,349 A | 3/1987 | Westreich |
| 4,650,927 A | 3/1987 | James |
| 4,658,417 A | 4/1987 | Hashimoto et al. |
| 4,677,659 A * | 6/1987 | Dargan .................... 379/93.27 |
| 4,700,378 A | 10/1987 | Brown |
| 4,737,980 A | 4/1988 | Curtin et al. |
| 4,754,474 A | 6/1988 | Feinson |
| 4,754,485 A | 6/1988 | Klatt |
| 4,757,267 A | 7/1988 | Riskin |
| 4,817,129 A | 3/1989 | Riskin |
| 4,825,045 A | 4/1989 | Humble |
| 4,833,308 A | 5/1989 | Humble |
| 4,866,750 A | 9/1989 | Chavarria et al. |

OTHER PUBLICATIONS

Lawrence R. Rabiner & Ronald W. Schafer, *Digital Techniques for Computer Voice Response Implementation and Applications*, 64 Proceedings of the IEEE, 416 (Apr. 1976).

Smith et al.; Alphabetic Data Entry Via the Touch–Tone Pad: A Comment, Human Factors, 1971, 13(2) pp. 189–190.

Pavlak et al.; Keypac—A Telephone Aid for the Deaf, IEEE, 27(9), Sep. 1979, pp. 1366–1371.

Bernstein et al.; Telephone Communication Between Deaf and Hearing Persons, IEEE, 1981.

Minneman, A Simplified Touch–Tone Telecommunication Aid for Deaf and Hearing Impaired Individuals, RESNA 8th Annual Conf., 1985, pp. 209–211.

Excerpt from IEEE Transactions on Biomedical Engineering, Aug. 1984.

Johnson, et al., DTMF Telecommunications for the Deaf and Speech–Impaired, IEEE 1981, pp. 29–32.

McIlroy, Development of a Spelling List, IEEE Transactions on Comm. vol. COM–30, No. 1, Jan. 1982.

Peterson, Computer Programs for Detecting and Correcting Spelling Errrors, Communications of the ACM, vol. 23, No. 12, Dec. 1980.

Bentley, Data Structures Programs, Communications of the ACM, vol. 26, No. 10, Oct. 1983.

Bentley, Aha! Algorithms, Article from Communications of the ACM, vol. 26, No. 9, Sep. 1983.

Witten et al., The Telephone Enquiry Service: a man–machine . . . , Int. J. Man–Machine Studies, vol. 9, pp. 449–464, 1977, Essex, U.K.

Bienhoff, New Applications, Computer, pp. 44–45, Nov. 1973.

Soderburg et al., The Touch–Tone Telephone—Transmission of Digital Information—(unknown source).

Riseman et al., A Contextual Postprocessing System for Error Correction Using . . . , IEEE Transactions on Computers, vol. c–23, No. 5, May 1974.

Otten et al., An Audio Input–Output Computer System for Medical Information, pp. 477–484, NIH, Bethesda, MD.

DeLeo et al., Medical Audio Response Telecommunications Information Network, Bio–Medical Computing, vol. 3, pp. 293–305, 1972.

Allen et al., The Telephone as a Computer Input–Output Terminal for Medical Information, JAMA, vol. 208, No. 4, pp. 673–679, Apr. 28, 1969.

Conway et al. , Tele–CUPL: A Telephone Time Sharing System, Communications of the ACM, vol. 10, No. 9, pp. 538–542, Sep. 1967.

Friedman, et al., Computer Program for Simulating Patient–Physician Encounter, Journal of Medical Education, vol. 48, Jan. 1973.

Medical and Hospital Information Systems, stamped Mar. 23, 1976 AM.

Boies et al., User Interface for Audio Communication System, IBM Technical Disclosure Bulletin, vol. 25, No. 7A, pp. 3371–3377, Dec. 1982.

Hull et al., Experiments in Text Recognition with Binary n–Gram . . . , IEEE Transactions on Pattern Analysis and Machine Intelligence, vol. PAMI–4, No. 5, Sep. 1982.

Deininger, Human Factors Engineering Studies of the Design . . . , The Bell System Technical Journal, pp. 995–1013, Jul. 1960.

Sederholm et al., Intelligent Telephone, IBM Technical Disclosure Bulletin, vol. 23, No. 9, pp. 4006–4008, Feb. 1981.

Hume, Abling the Disabled, Telephony, pp. 54–59, Oct. 1981.

Kroeger III, Modified Digram Algorithm, IBM Technical Disclosure Bulletin, vol. 24, No. 5, pp. 2528–2532, Oct. 1981.

Witten et al., A Dual Processor Structure for High Quality Real–Time Linear Predictive Analysis . . . , Digital Processes, vol. 5, pp. 257–269, 1979.

Vanderheiden, A high–Efficiency Flexible Keyboard Input Acceleration . . . , 2nd Internat'l. Conf. on Rehabilitation Engineering, Jun. 17–22, 1984, Canada.

Roa, et al., A Minimum Keystroke Text Generator, IEEE Computer Society, Oct. 31, 1981.

Ross, A Musical Language Computer Terminal For the Visually Impaired, IEEE Computer Society, Oct. 31, 1981.

A Procedure for Synchronizing Continuous Speech with its Corresponding Printed Text, IEEE, pp. 129–132, 1981.

Johnson et al., A Real–Time Phrase Recognizer Using Telephone Bandwidth Speech, MIT Lincoln Laboratory, pp. 464–467.

Smith et al., Alphabetic Data Entry Via the Touchtone Pad: A Comment, Human Factors, vol. 13, No. 2, pp. 189–190, Apr. 1971.

Campbell et al., Communication and Environmental Control System, IEEE Computer Society, Oct. 31, 1981.

McFarland, A Communications Aid for the Non–Oral Severely Disabled, IEEE Computer Society, Oct. 31, 1981.

Brines et al., Communication Via A Microcomputer, IEEE Computer Society, Oct. 31, 1981.

Koekebakker, Computer Voice Response/Recognition, Canadian Data Systems, pp. 26–31, May 1981.

Rosenberg, et al., Demisyllable–Based Isolated Word . . . , IEEE Transactions on Acoustics, Speech, and Signal Processing, vol. ASSP/31, No. 3, pp. 713–726, Jun. 1983.

Aho, et al., Efficient String Matching: An Aid to Bibliographic Search, Communications of the ACM, vol. 18, No. 6, pp. 333–340, Jun. 1975.

Jurgen, Electronics in Medicine, IEEE Spectrum, vol. 17, No. 1, pp. 81–86, Jan. 1980.

Foulds et al., Statistical Disambiguation of Multi–Character Keys, AAC Augmentative and Alternative Communication.

Comer, Heuristics for Trie Index Minimization, ACM Transactions on Database Systems, vol. 4, No. 3, pp. 383–395, Sep. 1979.

Hallenbeck, Kansys, The Kansys System—Full Speech Operating System for Blind Computer Users, IEEE Computer Society, Oct. 31, 1981.

Peterson, Computer Programs for Spelling Correction: An Experiment in Program Design, Publisher: Spring–Verlag, 1980.

Broomfield et al., Making a Data Terminal Out of the Touch–tone Telephone, Electronics, pp. 124–129, Jul. 3, 1980.

Bowman, et al., Proceedings of the Sixth Annual Conference on Rehabilitation Engineering, The Rehabilitation Engineering Society of North America, Jun. 12–16, 1983.

Nelson, Experiments on the Use of the Touchtone Telephone . . . , Journal of Speech and Hearing Research, vol. 13, pp. 30–36, 1970.

Morrison, Patricia—Practical Algorithm To Retrieve Information Coded In Alphanumeric, J. Assoc. for Computing Machinery, vol. 15, No. 4, pp. 514–534, Oct. 1968.

Witten, Principles of Computer Speech, Publisher: Academic Press, 1982.

Witten, et al., Reducing Keystroke Counts with a Predictive Computer Interface, pp. 3–10, IEEE 1982.

Jones, Row/Column Scanning with a Dynamic Matrix, IEEE Computer Society, Oct. 31, 1981.

Shinghal, A Hybrid Algorithm for Contextual Text Recognition, Journal of Pattern Recognition, vol. 16, No. 2 pp. 261–267, 1983.

Soffer, et al., Information Retrieval Based on Touch–tone Encoded Alphanumeric Keys, IEEE Transactions on Software Engineering, vol. SE–3, No. 2, Mar. 1977.

Li, et al., Statistical Models for Automatic Language Identification, IEEE, 1980.

Brady, et al., A Databased Approach to Character/Syllable/Word Sets, 5th Annual Conf. on Rehabilitation Engineering, Houston, TX 1982.

Glaser, A Telephone Communication Aid for the Deaf, IEEE Computer Society, Oct. 31, 1981.

Bernstein et al., Telephone Communication Between Deaf and Hearing Persons, IEEE 1984.

Stevens et al., Telephone Communication Between Deaf and Hearing Persons Using Speech–To–Text . . . , Proceedings Compte Rendu, 1984.

Steele, Text Output Improvement in Speech Captioner Performance, Proceedings Compte Rendu, 1984.

The Art of Computer Programming, Chapter 6: Searching, pp. 389–499, 1973.

Gibler et al., Adaptive Dictionary for Computer–Based Communication Aids, 6th Annual Conf. on Rehabilitation Engineering, 1983.

Richman, The Development of the Corpus, Word Frequency Book, American Heritage Publishing Co., 1971.

Arnott, et al., Stenotype Shorthand and Speech Synthesis in Vocal Prosthesis . . . , Proceedings of the 2nd Internat'l Conf. on Rehab. Engineering.

Allen et al., Cambridge Studies in Speech Science and Communication, Cambridge University Press, 1987.

Shannon, C.E., "A Mathematical Theory of Communication," The Bell System Technical Journal, pp. 623–656 (1948) [DEF0007654–7689].

Shannon, C.E., "Communication Theory of Secrecy Systems," The Bell System Technical Journal, pp. 656–714 (1949) [DEF0007749–7798].

Shannon, C.E., "Prediction and Entropy of Printed English," The Bell System Technical Journal, pp. 50–64 (1951) [DEF0007617–7633].

Meacham, L.A. et al., "Tone Ringing and Pushbutton Calling," The Bell System Technical Journal, pp. 339–360 (1958) [DEF0007942–7964].

Caldwell, Samuel H., "The Sinotype—A Machine for the Composition of Chinese From a Keyboard," Journal of Franklin Institute, vol. 267, No. 6, pp. 471–502 (Jun. 1959) [DEF0004194–4229].

Blair, Charles R., "A Program for Correcting Spelling Errors," Information and Control, vol. 3, No. 1, pp. 60–67 (1960) [DEF0006996–7005].

Lamb, S.M., and Jacobsen, W.H., "A High–Speed Large–Capacity Dictionary System," Univ. of CA, Berkeley, pp. 76–107 (1960) [DEF0008653–8685].

Schenker, L., "Pushbutton Calling with a Two–Group Voice–Frequency Code," The Bell System Technical Journal, vol. XXXIX, pp. 235–255 (Jan. 1960) [DEF0007587–7616].

Damerau, Fred J., "A Technique for Computer Detection and Correction of Spelling Errors," Communications of the ACM, vol. 7, No. 3, pp. 171–176 (Mar. 1964) [DEF0007609–7616].

Smith, Gale M., "What Hath God Wrought?," The Volta Review, Nat'l Technical Institute for the Deaf, vol. 67, No. 7, pp. 505–507 (Sep. 1964) [DEF0007650–7653].

Howes, Davis, "A Word Count of Spoken English," Journal of Verbal Learning and Verbal Behavior, vol. 5, No. 6, pp. 572–574 (1966) [DEF0007866–7869].

Alberga, Cyril N., "String Similarity and Misspellings," Communications of the ACM, vol. 10, No. 5, pp. 302–313 (May 1967) [DEF0006971–6983].

Galli, E.J. and Yamada, H., "An automatic dictionary and the verification of machine–readable text," IBM Systems Journal, vol. 6, No. 3, pp. 192–193 (1967) [DEF0008637–8652].

Thomas, Richard and Kassler, Michael, "Character Recognition in Context," Information and Control, vol. 10, pp. 43–64 (1967) [DEF0007800–7823].

The Laboratory Notebook, "Experimental Device May Extend Use of Touch–Tone Telephone to the Deaf," Bell Laboratories Record, vol. 46, No. 1, p. 34 (Jan. 1968) [DEF0006968–6970].

Nelson, John R, "Experiments on the Use of the Touch–Tone Telephone as a Communication Aid for the Deaf," Journal of Speech and Hearing Research, vol. 13, pp. 30–36, Bell Telephone Laboratories (1970) [DEF0000876–882].

Morgan, Howard L., "Spelling Correction in Systems Programs," Communications of the ACM, vol. 13, No. 2, pp. 90–94 (Feb. 1970) [DEF0007913–7918].

Warwick, P.S. et al., "The Picturephone System: Computer Access," Bell System Technical Journal, vol. _, No. 2, pp. 688–701 (Feb. 1971) [DEF0006098–6109].

Onderisin, Elaine M., "The Least Common Bigram: A Dictionary Argument Technique for Computerized Natural–Language Text Searching," ITT Research Institute, pp. 82–96 (1971) [DEF0008544–8558].

Harmon, Leon D., "Automatic Recognition of Print and Script," Proceedings of the IEEE, pp. 1165–1167 (Oct. 1972) [DEF0007853–7856].

Chang, Shi–Kuo, "An Interactive System for Chinese Character Generation and Retrieval," IEEE Transactions on Systems, Man and Cybernetics, vol. SMC–3, No. 3, pp. 257–265 (May 1973) [DEF0004230–4241].

Harris, Albert J. and Jacobson, Milton, D., "Basic Vocabulary For Beginning Reading," The Reading Teacher, vol. 26, No. 4, pp. 392–395 (Jan. 1973) [DEF0006694–6699].

Morgan, Samuel, P., "Minicomputers in Bell Laboratories Research," Bell Laboratories Record, pp. 194–201 (Jul./Aug. 1973) [DEF0006684–6693].

Vanderheiden, G. C. et al., "A Communications Device for the Severely Handicapped," ACM Proceedings of the Annual Conference, pp. 396–397 (1973) [DEF0007028–7032].

Vanderheiden, G. C. et al., "The Auto–Monitoring Technique and its Application in the Auto–Monitoring Communication Board (Auto–Com), A New Communication Device for the Severely Handicapped," Proceedings, Camahan Conference on Electronic Prosthetics (Nov. 1973) [DEF0007020–7027].

Corbett, Angela J, "Telephone Enquiry System Using Synthetic Speech," Thesis submitted for degree of M.S., Dept. of Electrical Eng'g Science, Univ. of Essex (Dec. 1974) [DEF0007473–7586].

Desautels, E. J. et al., "Touch Tone Input Techniques: Data Entry Using A Constrained Keyboard," Comp. Sci. Dept., Univ. of Wisc., Madison, pp. 245–253 (1974) [DEF0001258–1266].

Riseman, E. M. and Hanson, A. R., "A Contextual Postprocessing System for Error Correction Using Binary n–Grams," IEEE Transactions on Computers, vol. C–23, No. 5, pp. 480–493 (1974) [DEF0007634–7649].

Soderberg, J. H. et al., "The Touch Tone Telephone Transmission of Digital Information," IEEE, vol. COM–15, No. 6, pp. 812–824 (Dec. 1967) [DEF0008529–8541].

Vanderheiden, Gregg et al., "An Alternate Interface to Computers for the Physically Handicapped—the Auto–Monitoring Communication Board," AFIPS Conference Proceedings, vol. 43, pp. 115–120 (May 1974) [DEF0007033–7041].

Morris, Robert and Cherry, Lorinda L, "Computer Detection of Typographical Errors," IEEE, vol. PC–18, No. 1, pp. 54–56 (Mar. 1975) [DEF0007938–7941].

Baletsa, G. et al., "Design Parameters of and Intelligent Communication Device," Proceedings of the 29th Annual Conference on Eng'g in Medicine and Biology, vol. 18, p. 371 (Nov. 1976) [DEF0004171–4172].

Bellefleur, Phillip, A., "TTY Communication: Its History and Future," A Bicentennial Monograph on Hearing Impairment: Trends in the USA, First Edition, Ch. 16, pp. 107–112 (1976) [DEF0006988–6995].

Bourne, Charles P, "Frequency and Impact of Spelling Errors in Bibliographic Data Bases," Information Processing & Management, vol. 13, No. 1, pp. 1–12 (1977) [DEF0007006–7019].

Elovitz, H.S. et al., "Letter–to–Sound Rules for Automatic Translation of English Text to Phonetics," IEEE, vol. ASSP–24, No. 6, pp. 446–459 (Dec. 1976) [DEF0008443–8456].

Hanson, A.R. et al., "Context in Word Recognition," Pattern Recognition, vol. 8, No. 1, pp. 35–45 (Jan. 1976) [DEF0007824–7835].

Harris, Deberah and Vanderheiden, Gregg C., Chapter 12, Augmentative Communication Techniques, pp. 261–301 (1976) [DEF0007389–7431].

Rabiner, Lawrence R. and Schafer, Ronald W., "Digital Techniques for Computer Voice Response: Implementations and Applications," Proceedings of the IEEE, vol. 64, No. 4, pp. 416–433 (Apr. 1976) [AAS00189–206].

Vanderheiden, Gregg C., "Providing the Child With a Means to Indicate," Non–Vocal Communication Techniques and Aids for the Severely Physically Handicapped, pp. 20–75 (Jul. 1976) [DEF0007155–7213].

Vanderheiden, Gregg C. and Vanderheiden, Deborah, et al., "Communication Techniques and Aids for the Non–Vocal Severely Handicapped," Communication Assessment and Intervention Strategies, Ch. 15, pp. 607–652 (Jul. 1976) [DEF0007069–7117].

Jones, Randal L., "Row/Column Scanning With a Dynamic Matrix," Proceedings of the Johns Hopkins First National Search for Applications of Personal Computing to Aid the Handicapped, IEEE Computer Society Catalog No. 392, pp. 6–7 (Oct. 31, 1981) [DEF0001229–1248].

Kelso, D.P., Vanderheiden, G.C., Rodgers, B., Proceedings of the Fifth Annual Conference on Rehabilitation Engineering, US. Dept. of Education Office of Educational Research and Improvement, vol. 2, pp. 3, 24, 46–48, 101 (1982) [DEF0007432–7438].

Abbink, G. A., "Bridging the Worlds of the Deaf and Hearing," Telephony, pp. 76–80 (May 24, 1982) [DEF0005420–5423].

Feuerstein, Burg, "Lecture Notes in Computer Science," Cryptography (Mar. 1982).

Goodenough–Trepagnier, Cheryl et al., "Derivation of an Efficient Nonvocal Communication System," Human Factors, vol. 24, No. 2, pp. 163–172 (1982) [DEF0007118–7129].

Howell, D.M. et al., "Instruction Feature in Abbreviated Typing System," IP.com Electronic Publication (Feb. 10, 2005) (original publ. date Aug. 1, 1982) [DEF0006680–6683].

Streeter, J.M. et al., "On Abbreviating Command Names," The Bell System Technical Journal, vol. 62, No. 6, Part 3, pp. 1807–1826 (Jul. 1982) [DEF0006085–6097].

Myers, C. S. and Rabiner, L. R. "An Automated Directory Listing Retrieval System Based on Recognition of Connected Letter Strings," Journal of Acoustical Society of America, vol. 71, No. 3, pp. 716–727 (Mar. 1982) [DEF0004346–4357].

Rodgers, Barry L. et al., "Design of Universal Keyboard Emulators," 5th Annual Conference on Rehabilitation Engineering, Houston, TX, p. 45 (1982) [DEF0007436].

Vanderheiden, Gregg, "Computers Can Play a Dual Role for Disabled Individual," BYTE, vol. 7, No. 9, p. 138 (Sep. 1982) [DEF0007288–7321].

Vanderheiden, Gregg C., "The Practical Use of Microcomputers in Rehabilitation," Bulletin of Prosthetics Research, vol. 19, No. 1, pp. 1–5 (Mar. 1982) [DEF0007042–7049].

"Vocational Rehabilitation with Hearing–Impaired Clients," Rehab Brief, vol. VI, No. 10, ISSN: 0732–2623 (Oct. 1983) [DEF0006984–6987].

Fraenkel, A.S. et al., "Is Text Compression by Prefixes and Suffixes Practical?," Weizmann Institute of Science, pp. 289–311 (1983) [DEF0008559–8581].

Heckathorne, C.W. et al., "Microdec II—Anticipatory Computer Input Aid, Adaptive Dictionary For Computer–Bassed Communication Aids," Proceedings of the Sixth Annual Conference of Rehabilitation Eng'g, vol. 3, pp. 34–36; 165–170 (Jun. 1983) [DEF0001441–1462].

Rogers, Barry, L. et al., "The Data Routine Module: Accessing Computer Systems with Communication Aids," Proceedings of the Sixth Annual Conference on Rehabilitation Eng'g, vol. 3, pp. 31–33 (Jun. 12–16, 1983) [DEF0007444–7449].

Doan, Michael L., "Something New to Slip Under the Christmas Tree," US. News and World Report, pp. 49–50 (Nov. 28, 1984) [GVK002445–2446].

Call for Papers for 6th Annual Conference IEEE Eng'g in Medicine and Biology Society Frontiers of Eng'g and Computing in Health Care, Los Angeles CA, Sep. 15–16, 1984, printed in IEEE Eng'g in Medicine and Biology Magazine, vol. 2, No. 4, p. 51 (Dec. 1983) [GVK0001873–1874].

Carlgren, R.G., "Suffix–Dependent Hyphenation Data Storage Technique," IBM Technical Disclosure Bulletin, vol. 26 No. 11, pp. 6095–6096 (Apr. 1984) [DEF0005862–63].

Shennib, Adnan and Kondraske, George V., "An Improved DTMF Telecommunication Aid for the Deaf," Biomedical Eng'g Program and Electrical Eng'g Dept., Univ. of TX at Arlington (Oct. 15–16, 1984) [DEF0000445–448].

Shennib, Adnan, "New DTMF Telecommunications Aid for the Deaf," submitted for degree in Biomedical Eng'g at Univ. of TX at Arlington (Oct. 1984) [AAS00048–174].

Ad for Communications Device, Hearing Instruments, vol. 30, No. 1, p. 42 (1985) [DEF0005424].

Advertisement, "Thanks to People Express, You Can Now Make a Reservation Without Saying a Word," USA Today (Aug. 23, 1985) [GVK002288].

Jaffe, David J., "Alternate Access Methods for Users of Computer–Based Information Systems," Proceedings of the Eighth Annual Conference on Rehabilitation Technology (Jun. 24–28, 1985) [Polish Exh 6].

Kelly, Erin, "Business is Picking up on Tone Dial Services," USA Today (Aug. 23, 1985) [GVK002350].

Lifestyle Personal Communicator by Audio Bionics (Mar. 25, 1985) [DEF0005425–5426].

Minneman, Scott L., "A Telecommunications Aid for the Deaf," submitted to Dept. of Mech. Eng'g, MIT (Nov. 1984) [DEF0006826–6961].

Proceedings of the Second International Conference on Rehabilitation Engineering, Ottawa, Canada, vol. 4, ISSN 0733–5482, Index only (Jun. 1984) [DEF0001283–1309].

Erin Kelly, "Business is pickup up on tone dial services", USA Today, Aug. 23, 2006 issue, 1 page.

Thanks To People Express, You Can Now Make A Reservation Without Saying A Word, advertisement taken from USA Today Aug. 23, 2006 issue.

Computers and People with Handicaps (articles, advertisements, etc.), Prentke Romich Company, Shreve, Ohio, 10 pages total.

Communication Outlook, A Publication of the Internat'l Soc. for Augmentative and Alternative Comm. No. 4, vol. 5, Spring 1984, pp. 1–24.

William M. Walsh III, An Emergency Deaf Communications Systems, IEEE Computer Society 1981, pp. 35–36.

Harry Levitt, A Pocket Telecommunicator for the Deaf, IEEE Computer Society 1981, pp. 39–42.

Richard C. Bozzuto, Jr., The Universal Translating Modem: An Advanced Telecommunication Device for the Deaf; IEEE 1981, pp. 62–64.

Robert H. Weitbrecht, An Information Retrieval System for Use by Hearing–Impaired Telecommunicators, IEEE 1981, pp. 118–121.

Hansen et al., Telephones for the Deaf—Apparatus and Signalling Systems, Teleteknik, England 1981, No. 1–2, pp. 20–25.

Harry Levitt, Technical Papers; Johns Hopkins APL Technical Digest, vol. 3, No. 3, 1982, pp. 231–235.

Lory Garrett, "Phone aid lets deaf take calls", The Shorton, Wednesday, Mar. 28, 1984, University of Texas at Arlington, 2 pages.

Brad Smith, "Telephone device translates sight into sound for the deaf", Monday, Apr. 23, 1984, Arlington Daily News, 2 pages.

Fifth Plenary Assembly, Green Book—vol. VI–1, Telephone signalling and switching, The Internat'l Telecommunication Union, 1973.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–14 is confirmed.

* * * * *